A. H. MIDGLEY.
ELECTRIC STARTER.
APPLICATION FILED DEC. 5, 1917.
1,262,080.
Patented Apr. 9, 1918.
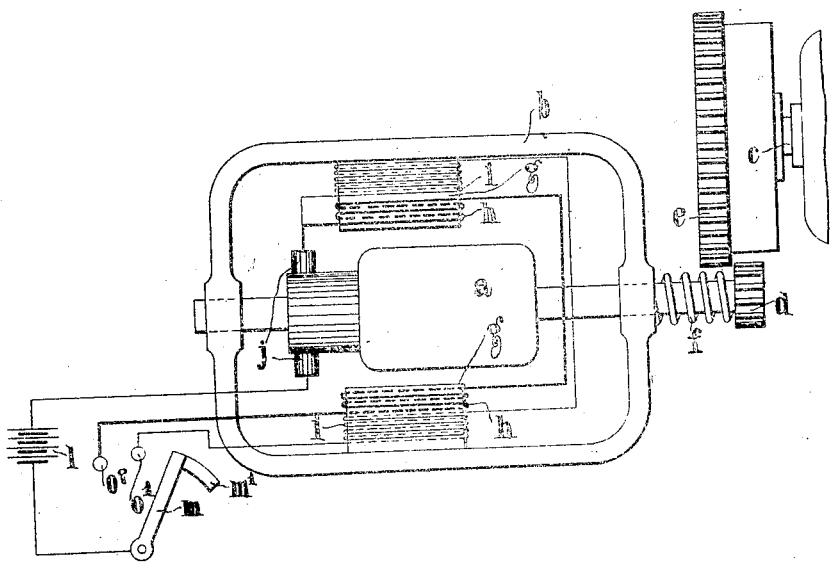
INVENTOR
Albert H. Midgley
by Brock, Parker Smith
ATTORNEYS

UNITED STATES PATENT OFFICE.

ALBERT HENRY MIDGLEY, OF ACTON VALE, ENGLAND, ASSIGNOR OF ONE-HALF TO CHARLES ANTHONY VANDERVELL, OF ACTON VALE, ENGLAND.

ELECTRIC STARTER.

1,262,080.  Specification of Letters Patent.  Patented Apr. 9, 1918.

Original application filed July 10, 1915, Serial No. 39,184. Divided and this application filed December 5, 1917. Serial No. 205,694.

*To all whom it may concern:*

Be it known that I, ALBERT HENRY MIDGLEY, a subject of the King of Great Britain and Ireland, and residing at Warple Way, Acton Vale, in the county of Middlesex, England, have invented certain new and useful Improvements in and Relating to Electric Starters, of which the following is a specification.

This invention relates to an improved electric starter for internal combustion engines, such as used on motor cars, or the like, of the kind in which use is made of a longitudinally displaceable armature for coupling the shaft of the electric motor with the engine shaft, and the displacement of which armature is effected by the axial pull exerted thereon by the field magnet.

In electric starters of the kind above referred to, the field is first strongly energized and the maximum current flowing through the armature reduced, until the shaft of the electric motor has been coupled with the engine shaft, whereupon the full working current is passed through the armature, and this has hitherto been attained by utilizing one and the same thick wire series winding for energizing the field before and after the coupling, said winding being used, owing to its low resistance, in series with a resistance to prevent short-circuiting of the battery, and by reducing the current flowing through the armature before the coupling by means of a resistance inserted in shunt with the armature. The electric energy consumed by the resistances referred to is not converted into any useful work and therefore constitutes a loss, and the main object of the present invention is to overcome this disadvantage by providing means for operating the machine before and after the coupling in the manner above referred to without the use of the additional resistances hitherto employed while insuring at the same time a strong energization of the field during the first period of the starting operation without the battery being short-circuited, and the passage of a strong current through the armature after the coupling has been effected.

According to the present invention, the field magnet of the electric motor is provided with a thin and a thick wire winding similar to those of a shunt and series winding, respectively,—viz., the number of turns and the total resistance of one coil being substantially greater than the number of turns and the total resistance of the other coil,—the thin wire winding being connected in series with the armature and a battery until the coupling of the armature shaft and the engine shaft has been effected, whereupon the thick wire winding is inserted in shunt with the thin wire winding, the machine now running as a series motor with the two windings in parallel with each other.

By the use of many turns of thin wire during the first step of the starting operation, the field magnet is strongly magnetized, whereby a strong axial pull is exerted upon the armature, while the voltage across the armature is thereby greatly reduced and the rotation imparted to the armature is consequently very slow. It will also be seen that in spite of the strong magnetization of the field magnet during this step of the starting operation, the current taken from the battery and flowing through the field excitation winding, and the armature, is greatly reduced as compared with the normal working current of the motor during the last part of the starting operation when the armature rotates to start the engine.

Referring to the drawings illustrating the invention diagrammatically, $a$ is the armature which is displaceably mounted in the frame $b$ of the motor, its shaft being coupled with the shaft $c$ of the engine to be started by means of a toothed gear, the members, $d$ and $e$, of which are mounted on the armature shaft and on the fly-wheel of the engine respectively. Each of the poles $g$ of the motor is provided with a thick wire winding $h$ and a thin wire winding $i$ similar to those of a series and shunt winding respectively, these windings being connected to the main brushes $j$ of the motor and with the battery $l$ through the intermediary of a switch, the arm $m$ of which is adapted first to make a contact with a stationary contact $o^1$ and then with a stationary contact $o^2$ in addition to its contact with $o^1$, the arm end being for this purpose provided with a long contact $m^1$.

The operation of the starter is as follows:—

When the switch arm $m$ is moved so that it makes contact with the stationary contact $o^1$, the poles $g$ are excited by means of the thin wire winding $i$ in series with the armature $a$ and the battery $l$, whereby the armature is drawn into the field in order to bring the members $d$ and $e$ of the gear into engagement with each other. After the coupling of the armature shaft with the engine shaft through the intermediary of the gear, the switch arm $m$ is shifted in such a position that its contact $m^1$ makes contact with the stationary contact $o^2$ in addition to its contact with the stationary contact $o^1$, whereby the thick wire winding $h$ is connected in shunt with the thin wire winding $i$, the motor now running as a series motor with the two windings $h$ and $i$ in parallel with each other.

The two windings $h$ and $i$ may be arranged to act differentially instead of in the same sense.

Having now described my invention, what I claim as new and desire to secure by Letters Patent is:—

A method of starting an internal combustion engine by means of an electric motor through the intermediary of a gear, one member of which is mechanically attached to the engine, and the other member thereof to an axially displaceable armature of the motor which is drawn into the field by the magnetization of the poles consisting in exciting the field by means of two excitation coils, the number of turns and the total resistance of the one coil being substantially greater than the number of turns and the total resistance of the other coil, the field being excited first by means of the excitation coil having the greater number of turns and the greater total resistance in series with the armature and a source of current, and then by means of the two excitation coils in parallel to each other, and the two thus connected together in series with the armature and source of current, as and for the purpose set forth.

In testimony whereof I have signed my name to this specification.

ALBERT HENRY MIDGLEY.